United States Patent [19]

Denham et al.

[11] Patent Number: 4,639,174

[45] Date of Patent: Jan. 27, 1987

[54] SELF-PLUGGING BLIND RIVET

[75] Inventors: Keith Denham; Stephen Archer, both of Welwyn, England

[73] Assignee: Avdel Limited, Welwyn Garden City, England

[21] Appl. No.: 669,867

[22] Filed: Nov. 9, 1984

[30] Foreign Application Priority Data

Nov. 17, 1983 [GB] United Kingdom ............... 8330688

[51] Int. Cl.⁴ .................................. F16B 13/04
[52] U.S. Cl. .................................. 411/34; 411/43; 411/56
[58] Field of Search ............ 411/34, 35, 36, 37, 411/38, 45, 56, 43, 70, 501

[56] References Cited

U.S. PATENT DOCUMENTS

| Re. 20,055 | 8/1936 | Huck | 411/43 X |
|---|---|---|---|
| 2,030,167 | 2/1936 | Miller | 411/34 |
| 2,030,168 | 2/1936 | Miller | 411/34 |
| 2,030,169 | 2/1936 | Huck | 411/34 |
| 2,061,628 | 11/1936 | Huck | 411/34 |
| 3,149,530 | 9/1964 | Koutc | 411/70 |
| 3,286,580 | 11/1966 | Jeal | 411/34 |
| 3,414,965 | 12/1968 | Stau et al. | 411/501 X |
| 3,515,419 | 6/1970 | Baugh | 411/43 X |
| 4,189,977 | 2/1980 | Hintz et al. | 411/34 |
| 4,222,304 | 9/1980 | Yoshida et al. | 411/34 |

FOREIGN PATENT DOCUMENTS

| 2625023 | 12/1976 | Fed. Rep. of Germany | 411/34 |
|---|---|---|---|
| 1241123 | 8/1960 | France | 411/34 |
| 1377442 | 9/1964 | France | 411/45 |
| 445204 | 2/1968 | Switzerland | 411/34 |
| 1495592 | 12/1977 | United Kingdom | 411/45 |

Primary Examiner—Thomas J. Holko
Attorney, Agent, or Firm—Oblon, Fisher, Spivak, McClelland, & Maier

[57] ABSTRACT

The rivet comprises a tubular body 12 having a shank 14 having a rivet head at one end and an end portion 32 of which is tapered externally and internally towards the other (tail) end 20. A stem 10, disposed in the bore 18 of the body, has a stem-tail 22 which projects from the head end and breaks off when the rivet is set, a plug 24 in the bore 18, and a terminal head 28 abutting the tail-end 20. The diameter of the plug is reduced progressively and stepwise towards the terminal head, providing an abutment 50 and an annular groove 29 between the terminal head 28 and the abutment 50. Material of the end portion 20 extends into the groove to maintain the body and stem assembled, and enters further into the groove during setting of the rivet.

The rivet is set by pulling the stem tail while supporting the body, causing the shank to collapse into a bulge which provides a blind head.

The external tapering of the portion 32 promotes bulging at a lower applied force than would otherwise be required. Loss of the plug is prevented by the abutting of body material in the groove against the abutment 50, assisted by friction between the body and splines 44 on the plug which embed in a locking region of the body during setting.

12 Claims, 10 Drawing Figures

SELF-PLUGGING BLIND RIVET

This invention relates to a self-plugging blind rivet and more particularly, although not exclusively, to a high-strength self-plugging blind rivet of the breakstem kind.

Self-plugging blind rivets are well known, and generally comprise a tubular rivet body having a substantially cylindrical elongate shank and a radially enlarged preformed rivet head at one end of the shank with a bore which extends axially through the head and shank, and an elongate stem which extends through the bore of the body. The stem comprises a stem-tail which projects from the head end of the body, a plug portion which is disposed within the bore of the body, and a radially enlarged terminal head adjacent to the other (tail) end of the shank.

In order to set the rivet, the projecting stem-tail is gripped and pulled while the head of the body is supported, thus pulling the terminal head towards the head of the body, whereby the tail end of the shank is expanded to form a blind head.

After the setting of the rivet, the plug portion of the stem is retained by the body, plugging the bore and thereby contributing substantially to the shear strength of the set rivet. It is usual, although not essential, to remove the stem-tail from the remaining plug portion after the rivet has been set and this is usually achieved by arranging that the stem tail will break away from the plug portion when subjected to a predetermined tensile load to which the stem will become subjected once the rivet reaches the fully set condition. Such a rivet is known as a "breakstem rivet".

In some kinds of self-plugging blind rivets, the terminal head is tapered towards the tail end of the body whereby the terminal head is adapted to enter and thereby expand the tail end of the body so as to form the blind head, but in blind rivets of the kind to which the present invention relates, the terminal head is adapted to abut the tail end of the body and, on being pulled towards the head of the body, to cause the shank to shorten and bulge outwardly to form a blind head.

In many situations in which self-plugging blind rivets are used, it is a matter of considerable importance that the plug portion should not come out of the bore of the body of the set rivet, not only because of the consequent loss of shear strength in the rivet but also because the lost plug itself may constitute a dangerous piece of debris. In order to avoid this danger, it is desirable to contrive that the plug portion with the terminal head be locked in the bore of the body of the set rivet, and various ways of achieving this have been proposed, some of them being rather elaborate.

We have now devised a self-plugging blind rivet, the construction of which is not unduly elaborate, and in which, during setting of the rivet, the plug portion becomes effectively locked in the body.

According to the present invention, there is provided a self-plugging blind rivet comprising an elongate stem and a tubular rivet body, the body having an elongate shank, a radial enlargement providing a rivet head at one end of the shank, a tail end at the other end of the shank, and a bore extending axially through the rivet head and shank to the tail end, the stem extending through the bore of the body and comprising a stem-tail which projects from the head end of the body, and a plug connected to the stem-tail, the plug having a generally cylindrical first part adjacent to the stem-tail, a second part which is spaced from the stem-tail by the first part, and a radially enlarged terminal head at the end of the stem remote from the stem-tail, the terminal head presenting an underhead surface which faces towards the stem-tail for abutting the tail-end of the shank, and the diameter of the plug in the second part being reduced abruptly in the direction away from the first part at a position spaced from the underhead surface of the terminal head so as to provide an abutment which faces towards the terminal head and to provide an annular groove between the said abutment and the underhead surface, the shank of the body having a main portion adjacent to the rivet head and an end portion spaced from the rivet head by the main portion, characterised in that the end portion of the shank has an external diameter which reduces progressively in the direction towards the tail end over a length, in the axial direction, greater than the width of the annular groove, and the end portion has a radially inwardly extending part adjacent to the tail end of the shank, which part extends into the annular groove.

The reduction in diameter of the plug which provides the abutment may be so abrupt that when, in the set rivet, there is applied to the plug an increasing force which tends to push the plug axially out through the tail end of the body, the material of the body which extends into the annular groove resists the pushing out of the plug until the material of the body ruptures.

The external diameter of the end portion of the shank may reduce progressively through a substantially smooth taper.

The external diameter of the end portion of the shank may reduce progressively through a plurality of stepwise reductions.

The internal diameter of the end portion of the shank may be reduced progressively towards the tail end of the shank.

The diameter of the second part of the plug may be reduced progressively towards the terminal head.

The progressive reduction in diameter of the second part of the plug may be provided by the said groove and an initial reduction in diameter between the groove and the main part of the plug.

The said initial reduction may be a stepwise reduction.

The said initial reduction may be by means of a single abrupt reduction.

The said initial reduction may be through a taper.

The part of the shank which exends into the annular groove may embrace the stem between the abutment surface and the underhead surface.

The abutment surface presented at the position of the said abrupt reduction may extend radially of and substantially at right angles to the longitudinal axis of the stem.

The bore of the body may have a locking region in the vicinity of the rivet head, in which region the diameter of the bore is reduced as compared with the diameter of the bore between the said locking region and the said end portion, and the first part of the plug may have a plurality of circumferentially spaced projecting splines which, on pulling the plug along the bore in the direction towards the rivet head, will form longitudinal grooves in the body peripherally of the locking region of the bore.

The said projecting splines may be formed in a zone of the first part of the plug which splined zone is adjacent to the stemtail, and the first part of the plug may have a further zone spaced from the stem-tail by the splined zone, which further zone has a diameter substantially the same as the maximum diameter of the splined zone.

The tail-end of the shank preferably has a diameter not greater than the diameter of the underhead surface of the terminal head.

The terminal head may have an undercut underhead surface.

The rivet may be a breakstem rivet having a breakneck joining the stem-tail to the plug.

Embodiments of the invention will now be described, by way of example, with reference to the accompanying diagrammatic drawings, in which.

Figure 1:
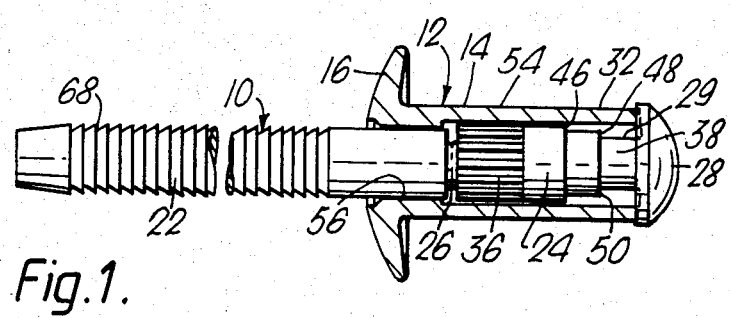
FIG. 1 is an elevation, partly in section, showing a stem and a rivet body for self-plugging breakstem blind rivet according to the invention, in an incomplete state of assembly.

Referring first to FIG. 1 of the drawings, a self-plugging blind rivet comprises an elongate stem 10 and a tubular rivet body 12 which, prior to use of the rivet, are assembled together to form a unitary structure.

The body 12 comprises an elongate shank 14 of circular cross section and which, prior to assembly, is of constant diameter throughout its length, and a radially enlarged rivet head 16 at one end of the shank. A bore 18 extends axially through the rivet head 16 and shank 14 to the end of the shank remote from rivet head 16 which end is indicated by the reference 20 and is hereinafter referred to as the "tail-end".

The stem 10 comprises an elongate stem-tail 22, a plug 24 which is joined to the stem-tail by a narrow breakneck 26, and a radially enlarged terminal head 28 at the end of the plug (and hence also at the end of the stem) which is remote from the stem-tail 22. The plug has an annular groove 29 immediately adjacent to the terminal head 28. The terminal head 28 has an underhead surface 30 which faces generally towards the stem-tail 22 and across the groove 29. In this embodiment the terminal head is undercut, which is to say that the underhead surface 30 is recessed so as to present a surface which, at the periphery of the head, is slightly nearer to the stemtail 22 than is the radially inner part of the underhead surface.

Prior to use of the rivet, the stem 10 and rivet body 12 are assembled together, the stem-tail being inserted into the bore 18 at the tail-end 20 of the body and passed through the bore until the underhead surface 30 of the terminal head 28 abuts the tail-end 20 of the body, and the stem-tail 22 projects from the end of the body having the preformed rivet head 16, and an end portion 32 of the shank 14 adjacent to the tail-end 20 is then crimped so as to deform the end portion 32 and cause an internal part 34 of the end portion 32 immediately adjacent to the tail-end 20 to enter the groove 29, thus enabling the body to retain the stem in the bore and allow the thus assembled rivet to be manipulated without the parts becoming separated prior to use.

Figure 2:
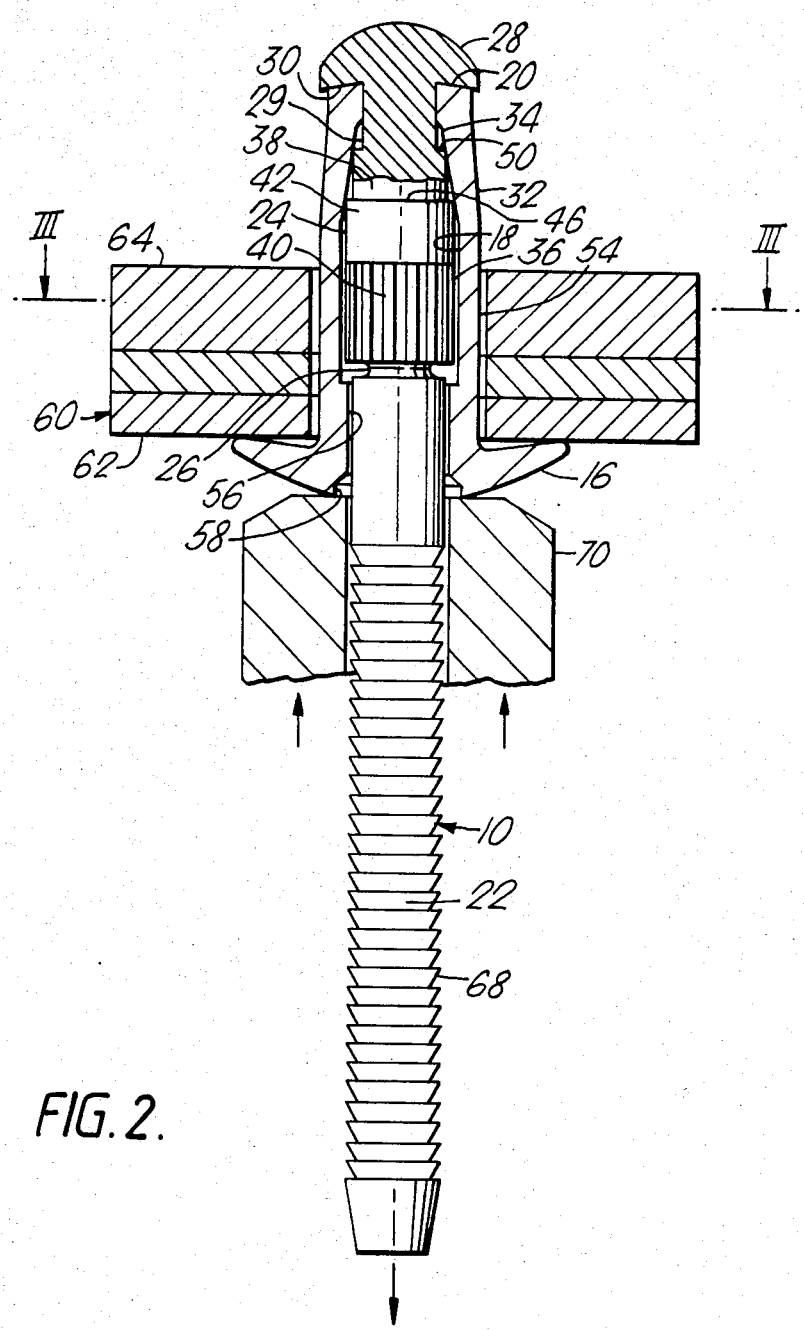
FIG. 2 is a partly sectional elevation showing a self-plugging breakstem blind rivet according to the invention and a work-piece comprising three apertured members which are to be fastened together by means of the rivet, together with part of a tool for setting the rivet.

A self-plugging blind rivet according to the invention and so assembled is shown in FIG. 2. The self-plugging blind rivet of this embodiment is of the kind known as a breakstem rivet. Thus, referring more particularly to FIG. 2 of the drawings, it will be seen that the narrow breakneck which connects the plug 24 to the stem-tail 22 is made the weakest part of the stem 10 so that, when the stem is subjected to tension, it will break at the breakneck rather than elsewhere.

The plug 24 comprises a generally cylindrical first part 36 immediately adjacent to the breakneck, and a second part 38 which is spaced from the stem-tail and breakneck by the first part 36. The first part 36 comprises two adjacent zones, namely a splined zone 40 immediately adjacent to the breakneck 26, and a further zone 42 spaced from the breakneck by the splined zone, the further zone 42 having a plain cylindrical surface. The splined zone 40 is formed with a plurality of circumferentially spaced splines 44 which extend longitudinally of the stem and project radially outwardly. It will of course be appreciated that the diameter of the splined zone varies between a maximum and a minimum according to whether it is measured through or between the splines, but, taken at the maximum, that is, across a circle on which the radially outermost parts of the splines lie, the diameter of the splined zone is substantially the same as that of the further zone 42 so that, overall, the first part 36 of the plug is generally cylindrical.

In the second part 38 of the plug, the diameter of the plug reduces from that of the first part 36 in the direction away from the first part and towards the terminal head 28. In this embodiment, the reduction in diameter is effected in two stages, so that the reduction is progressive, there being an initial reduction 46 immediately adjacent to the first part of the plug, and an abrupt further reduction 48 at a position spaced from the terminal head and from that end of the second part which adjoins the first part of the plug.

Figure 4:
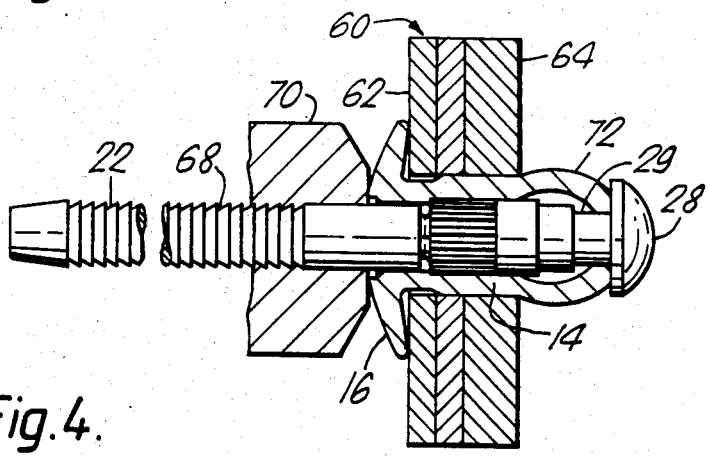
FIG. 4 is a partly sectional elevation to FIG. 2, but showing an early stage in the setting of the rivet.

A particular object of making the further reduction abrupt is to provide an annular abutment 50 facing axially towards the terminal head, and for this reason we prefer the further reduction 48 to be as abrupt as possible. We believe that, ideally, the abutment 50 should extend radially at right angles to the axis of the stem but, having regard to the practical difficulties of manufacturing stems, some departure from this ideal can be tolerated without great disadvantage. The initial reduction 46 is not intended to provide an abutment and does not behave as an abutment, but is provided for the purpose of contributing to the progressive reduction of the diameter of the second part of the plug so that the rate of redution is less than would be provided by the abrupt further reduction 48 alone. While the initial reduction could be provided by a taper, as in the embodiment shown in FIG. 7a, we find it convenient to make the initial reduction stepwise as shown in FIGS. 1, 2 and 4.

The annular groove 29 has a cylindrical root, and has a width, between the abutment surface 50 and the underhead surface 30, which is substantially the same as, or slightly greater than, the wall thickness at the tail-end of the shank 14.

The fact that the diameter of the plug is initially reduced at a position spaced from the terminal head by a distance greater than the width of the groove 29 permits a progressive reduction in both internal and external diameter of the end portion of the shank also to be achieved over an axial length substantially greater than the width of the groove.

Referring particularly to FIG. 2, it will be seen that, consequent upon the crimping operation which is performed during assembly of the stem and body, the shank 14 of the body of the assembled rivet falls into two distinct portions, namely a main portion 54 adjacent to the rivet head 16, and the end portion 32 previously referred to which, as a result of the crimping operation, tapers to a smaller diameter at the tail-end 20 of the shank so that both the internal and external surfaces of the end portion form a distinct angle with the internal and external surfaces respectively of the main portion 54. The taper angle of the crimped, tapering end portion 32 is such that the progressive reduction in diameter, both externally and internally, of the end portion corresponds generally to the progressive reduction in diameter of the second part 38 of the plug 24.

The inwardly extending part 34 of the end portion 32 in this embodiment enters so far into the annular groove 29 between the abutment surface 50 and the underhead surface 30 as to tightly embrace the small diameter part of the plug at the bottom of the annular groove 29, having been crimped rather more firmly than the rest of the end portion.

The bore of the rivet body 12 has a locking region 56 in the vicinity of the rivet head 16, in which region the diameter of the bore is reduced to a diameter corresponding to or slightly greater than the minimum diameter of the splined zone of the plug. The axial length of the locking region 56 is slightly greater than that of the splined zone 40 of the plug. The body has a short counterbore 58 at the head end of the bore, the counterbore having substantially the same diameter as the main part of the bore 18 which extends from the locking region 56 to the tapered end portion 32.

In the unset rivet, the stem-tail 22 extends with clearance through the locking region 56. The first part 36 of the plug is disposed in the main part of the bore 18 which extends between the locking region 56 and the end portion 32, and the first part 36 is of such a maximum diameter as to be a clearance fit in the main part of the bore and such as to be an interference fit in the locking region 56. In consequence, when the stem is pulled to set the rivet, causing the splined zone 40 of the plug to be drawn into the locking zone, the splines 44 cut or swage their way into the material of the body peripherally of the locking zone, forming in the material of the body longitudinal grooves and complementary splines which interengage the locking zone by projecting between the splines 44 of the plug. Subsequently, the plain cylindrical further zone 42 may enter the locking zone, swaging the complementary splines of the body back into the longitudinal grooves, thereby closing the grooves behind the splines 44. The interengagement between the splined zone 40 of the plug and the longitudinal grooves and complementary splines in the locking region 56 of the body serves, in the set rivet, to prevent rotation of the plug relative to the body, and the closing of the longitudinal grooves behind the splines will tend to lock the plug in the body and thus prevent withdrawal of the plug from the tail-end of the body.

However, the self-plugging blind rivet of the invention has means which, in the set rivet serves further to assist retention of the plug within the body, as will become apparent from the following explanation.

Thus, referring initially to FIG. 2, in this example the self-plugging blind rivet is used to fasten together three apertured members which are assembled together, with their apertures aligned, to form a workpiece 60. The workpiece 60 has a front side 62 which is accessible to an operator, and a rear or "blind" side 64 which need not be accessible. The aligned apertures extend from the front side to the blind side and the assembled rivet is inserted into the aligned apertures so that the rivet head 16 abuts the front side of the workpiece, and the shank 14 extends through the workpiece, and the terminal head of the stem, the tapered end portion and part of the main portion 54 of the shank project beyond the blind side. The stem-tail 22, which is formed with a plurality of annular pulling grooves 68, is then gripped and pulled by means of a tool having means (not shown) for gripping the grooved stem-tail 22 and an annular anvil 70 for abutting the rivet head 22 and through which the stem-tail is inserted into engagement with the gripping means.

The tool is then operated to pull the stem axially relative to the body in a direction to draw the terminal head 28 of the stem towards the rivet head 16 while the body is supported by the anvil, as indicated by the arrows in FIG. 2. At this point, it is appropriate to mention that the stem is formed of a hard material, resistant to deformation although designed to break at the breakneck when subjected to a predetermined high tensile stress, and in this embodiment is formed of very hard toughened steel, and the body is formed of a relatively soft deformable material, for example aluminium alloy or, as in this embodiment, alloy steel.

Due to the abutting of the tail-end 20 of the shank by the underhead surface 30 of the terminal head, the operation of the tool subjects the shank 14 to compressive stress, and in consequence the projecting part of the shank begins to deform, forming an outward circumferential bulge 72 between the blind face of the workpiece and the terminal head, and at the same time, the part of the shank within the workpiece expands radially to fill the apertures, as can be seen in FIG. 4. More particularly, the bulge 72 is centred at a position lying between the ends of the tapered end portion 32 but spaced from the tail end 20 of the shank so that the inwardly extending part 34 remains located in the annular groove 29.

Figure 5:
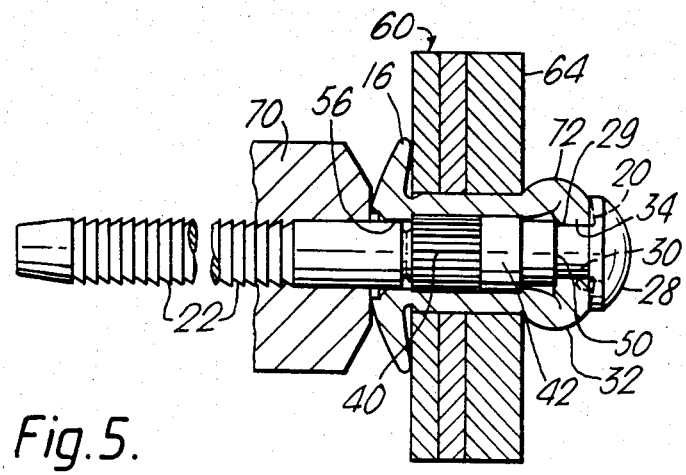
FIG. 5 is an elevation similar to FIG. 4 but showing a later stage in the setting of the rivet.

As the pulling of the stem progresses, the splined zone 40 of the plug enters and passes along the locking region 56 as previously discussed, and the bulge 72 begins to engage the blind side of the workpiece around the apertures, and thus constitute a blind head. At the same time, the end portion 32 begins to be thrown into a fold. The effect of this folding is to drive part of the end portion which is between the fold and the tail end 20 more fulling into the annular groove 29, causing some plastic flow of the material in the groove so that it fills the groove between the abutment surface 50 and the underhead surface 30, as can be seen in FIG. 5. With continued pulling of the stem, the folding of the shank material between the terminal head and the workpiece becomes more acute so that the resultant blind head abuts a substantial area of the blind side of the workpiece peripherally of the aperture and the folding parts of the shank close up, substantially eliminating the voids periperally of the annular groove which had been enlarged by the initial bulging of the end portion.

Figure 6:
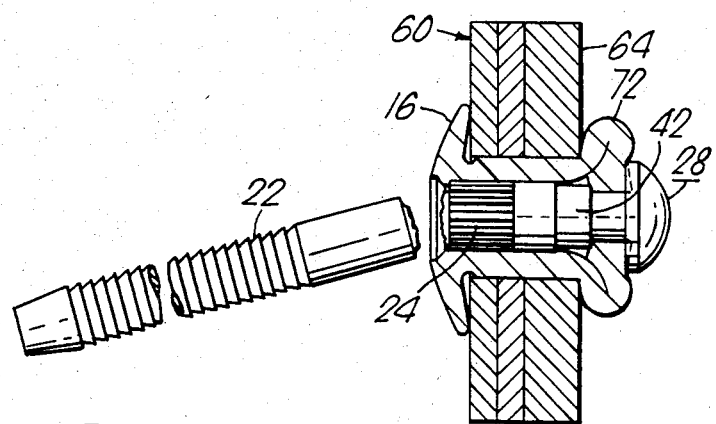
FIG. 6 is an elevation similar to FIG. 5 but showing the rivet after being fully set in the workpiece.

Eventually, the plain cylindrical further zone 42 begins to enter the locking region of the bore and this, together with increasing resistance to further deformation of the body in the region of the blind head, results in the fact that the tension required to pull the stem further exceeds the tension which the breakneck can withstand, and consequently the stem breaks at the breakneck, allowing the tool to be removed and the stem-tail to be discarded, leaving the rivet fully set in the workpiece with the members of the workpiece tightly clamped between the rivet head and the blind head, as shown in FIG. 6.

By reason of the progressively reducing external diameter of the end portion of the shank of the body, the compressive force which is applied to the tail-end of the shank by the terminal head on pulling the stem is transmitted through the tapering end portion in a direction towards the rivet head but inclining outwardly at an angle to the longitudinal axis of the shank. This results in the generation of forces which promote the formation of a bulb-like circumferential bulge in the shank at an axial applied load of a lower magnitude than would be required to cause similar bulging of a similar shank having no such progressive reduction in external diameter towards the tail-end.

We consider that, in order to ensure that in the fully set rivet there is a satisfactory resistance to the pushing of the plug axially out of the body through the tail-end by an increasing force applied to the plug, it is necessary that the abrupt reduction in diameter which provides the abutment be so abrupt that the face of the abutment is sufficiently inclined to the longitudinal axis of the plug that it is unable to deform the material of the body extending into the annular groove sufficiently to allow the plug to leave the body before the material of the body ruptures. By making the face of the abutment substantially at right angles to the axis of the plug, there is very little tendency, when an attempt is made to push the plug out of the tail-end of the body, for the abutment to deform the material of the body which has entered into the annular groove in a radially outward direction, in the manner of a tapered wedge. Consequently, the inwardly extending part 34 tends to remain in the annular groove 29 and abutting the abutment. The force applied to the plug therefore places the shank of the body under tension and we find that the material of the body ruptures, only allowing the plug to leave the body by taking with it part of the material of the body which is engaged in the annular groove 29.

The invention may be embodied other than as sepcifically described above. Thus, for example, instead of the progressive reduction in diameter of the second part of the plug being effected by two stepwise reductions, each stepping the diameter of the plug down to a smaller diameter cylindrical part and presenting a clearly defined abutment surface substantially at right angles to the axis of the stem, the progressive reduction in diameter could be achieved in a more gently progressive manner, although this can be expected to be less effective in assisting retention of the plug in the body of the set rivet.

Thus, the initial reduction in diameter could be achieved by a taper extending to the position of the abrupt further reduction. The further reduction itself could also be achieved by a taper, but such a taper would need to be appreciably steep in order to act as an abutment effective to abut the internal part of the end portion so as to resist pushout of the plug. Alternatively, the abutment could be undercut so as to overhang the annular groove somewhat similarly to the underhead surface of the terminal head.

Although the end portion 32 of the shank has been shown as being frusto-conical and having a substantially smoothly tapered external surface, it could nevertheless be tapered through a series of stepwise reductions in its external diameter, although this is not thought to be advantageous.

FIGS. 7a, 7b, 7c and 7d show fragmentarily some alternative forms of plug which are generally similar to the plug 24 of the foregoing embodiment and in which features corresponding to those of the foregoing embodiment are indicated by the same reference numerals.

Figure 7A:
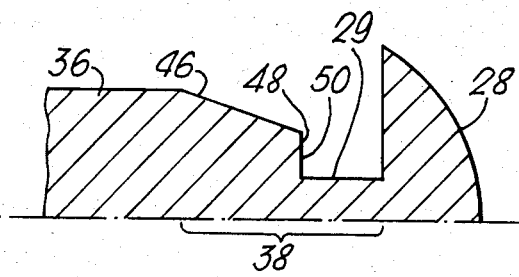
FIGS. 7a, 7b, 7c and 7d are fragmentary sectional elevations illustrating alternative forms of stem.

In the plug shown in FIG. 7a, the second part 38 has an initial reduction in diameter provided by a taper 46, and an abrupt further reduction 48, in the form of a step, which provides an abutment 50 and a groove 29 having a cylindrical root adjacent to the head 28.

Figure 7B:
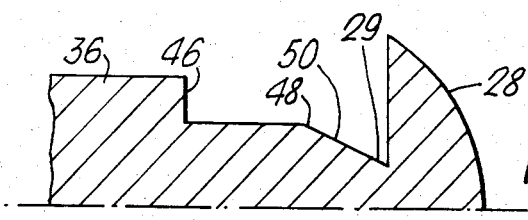

In the plug shown in FIG. 7b, the second part 38 has an initial reduction in diameter in the form of an abrupt step 46 leading to a cylindrical part of reduced diameter, and an abrupt further reduction, spaced from the first part 36, in the form of a steep taper 48 which extends to the terminal head, defining a V-shaped groove 29 and providing an abutment 50.

Figure 7C:
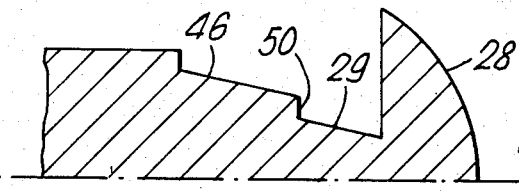

In the plug shown in FIG. 7c, the second part has an initial reduction in diameter provided by the combination of a step and a taper 46, and a further reduction in the diameter is provided by the combination of an abrupt step, which provides an abutment 50, and a taper 29 which forms the root of a groove between the terminal head 28 and the abutment 50.

Figure 3:
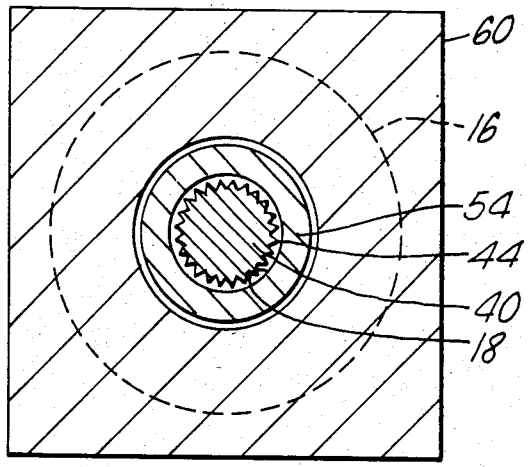
FIG. 3 is a sectional elevation on the line III—III of FIG. 2.
Figure 7D:
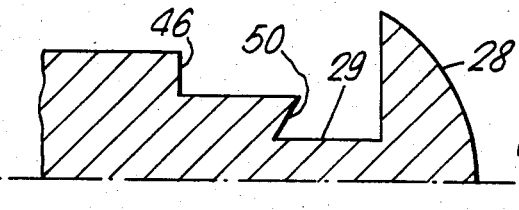

FIG. 7d shows a plug which is the same as that of the embodiment of FIGS. 1 to 3 except that it provides an undercut abutment surface 50 which overhangs the groove 29 between the abutment and the terminal head 28.

We claim:

1. A self-plugging blind rivet comprising an elongate stem and a tubular rivet body, the body having an elongate shank, a radial enlargement providing a rivet head at one end of the shank, a tail-end at the other end of the shank, and a bore extending axially through the rivet head and shank to the tail end, the stem extending through the bore of the body and comprising a stem-tail which projects from the head end of the body, and a plug connected to the stem-tail, the plug having a generally cylindrical first part adjacent to the stem-tail, a second part which is spaced from the stem-tail by the first part, and a radially enlarged terminal head at the end of the stem remote from the stem-tail, wherein the second part has a maximum diameter not greater than the diameter of the cylindrical first part, and the diameter of the plug is reduced progressively in the second part in the direction towards the terminal head, the second part having an initial reduction in diameter adjacent to the cylindrical first part, and an abrupt further reduction in diameter at a position spaced from the first part and from the underhead surface, said abrupt further reduction providing an abutment which faces towards the terminal head and an annular groove between the said abutment and the underhead surface, the terminal head presenting an underhead surface which faces towards the stem-tail for abutting the tail-end of the shank, the shank of the body having a main portion adjacent to the rivet head and an end portion spaced from the rivet head by the main portion, wherein the external and internal diameters of the end portion of the shank reduce progressively in the direction towards the tail-end over an axial length greater than the width of the annular groove, and the end portion has a radially inwardly extending part adjacent the tail-end of the shank, which part extends into the annular groove.

2. A self-plugging blind rivet according to claim 1, wherein the external diameter of the end portion of the shank reduces progressively through a substantially smooth taper.

3. A self-plugging blind rivet according to claim 1, wherein the internal diameter of the shank and the diameter of the plug reduce at substantially the same general rate.

4. A self-plugging blind rivet according to claim 3, wherein the said initial reduction is a step-wise reduction of the diameter.

5. A self-plugging blind rivet according to claim 3, wherein the said initial reduction is by means of a single stepwise reduction of the diameter.

6. A self-plugging blind rivet according to claim 3, wherein the said initial reduction is through a taper.

7. A self-plugging blind rivet according to claim 1, wherein the abutment provided by the said abrupt reduction extends radially of, and substantially at right angles to, the longitudinal axis of the stem.

8. A self-plugging blind rivet according to claim 1, wherein the said part of the shank which extends into the annular groove embraces the stem between the abutment and the underhead surface.

9. A self-plugging blind rivet according to claim 1, wherein the terminal head has an undercut underhead surface.

10. A self-plugging blind rivet according to claim 1, wherein the tail-end of the shank has a diameter not greater than that of the underhead surface of the terminal head.

11. A self-plugging blind rivet, according to claim 1, wherein the stem has a breakneck joining the stem-tail to the plug.

12. A self-plugging blind rivet according to claim 1, wherein the said further reduction in diameter of the plug which provides the abutment is sufficiently abrupt that when, in the set rivet, there is applied to the plug an increasing force which tends to push the plug axially out through the tail-end of the body, material of the body which extends into the annular groove resists the pushing out of the plug unitl the material of the body ruptures.

* * * * *